US008570380B1

(12) United States Patent
Sayre

(10) Patent No.: US 8,570,380 B1
(45) Date of Patent: *Oct. 29, 2013

(54) ANIMATED DISPLAY CALIBRATION METHOD AND APPARATUS

(75) Inventor: Rick Sayre, Kensington, CA (US)

(73) Assignee: PIXAR, Emeryville, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/301,710

(22) Filed: Nov. 21, 2011

Related U.S. Application Data

(63) Continuation of application No. 12/837,404, filed on Jul. 15, 2010, now Pat. No. 8,085,303, which is a continuation of application No. 11/370,262, filed on Mar. 6, 2006, now Pat. No. 7,760,231.

(60) Provisional application No. 60/660,216, filed on Mar. 9, 2005.

(51) Int. Cl.
*H04N 17/00* (2006.01)

(52) U.S. Cl.
USPC ............................................. 348/189

(58) Field of Classification Search
USPC ......... 348/189, 180, 181, 190, 191, 192, 553, 348/571, 687, 686; 345/589, 581
See application file for complete search history.

(56) References Cited

U.S. PATENT DOCUMENTS

| | | | |
|---|---|---|---|
| 5,038,210 | A | 8/1991 | Deckelmann et al. |
| 5,247,358 | A | 9/1993 | Richards |
| 5,483,259 | A | 1/1996 | Sachs |
| 5,502,795 | A | 3/1996 | Shirouzu |
| 5,670,985 | A | 9/1997 | Cappels et al. |
| 5,699,111 | A | 12/1997 | Dairiki et al. |
| 5,752,057 | A | 5/1998 | Lifshitz et al. |
| 5,903,273 | A * | 5/1999 | Mochizuki et al. ............ 345/423 |
| 5,977,981 | A | 11/1999 | Brown |
| 5,990,940 | A | 11/1999 | Hashimoto et al. |

(Continued)

FOREIGN PATENT DOCUMENTS

WO  2006/096846  9/2006

OTHER PUBLICATIONS

"ERICarts European Institute for Comparative Cultural Research", Pyramid of Representation, 3 pages. Retrieved on May 18, 2006 from http://www.web.archive.org/web/20060518171101/http://www.ericarts.org/web-/empirical-research.php.

(Continued)

*Primary Examiner* — Paulos M Natnael
(74) *Attorney, Agent, or Firm* — Kilpatrick Townsend & Stockton LLP

(57) ABSTRACT

A method for adjusting properties of a display includes displaying a first pluge image on the display to a user, wherein the display includes a plurality of locations, wherein the first pluge image comprises a first plurality of output values associated with the plurality of locations, thereafter displaying a second pluge image on the display to the user, wherein the second pluge image comprises a second plurality of output values associated with the plurality of locations, wherein the first plurality of output values are different from the second plurality of output values, and receiving a display adjustment input from the user, wherein the display adjustment input from the user is in response to the user viewing the first pluge image on the display and in response to the second pluge image on the display.

20 Claims, 5 Drawing Sheets

(56) References Cited

U.S. PATENT DOCUMENTS

| | | | |
|---|---|---|---|
| 6,005,636 A * | 12/1999 | Westerman | 348/571 |
| 6,025,829 A | 2/2000 | DeLucia et al. | |
| 6,184,895 B1 * | 2/2001 | Boezeman et al. | 345/589 |
| 6,249,272 B1 | 6/2001 | Yagi et al. | |
| 6,377,262 B1 * | 4/2002 | Hitchcock et al. | 345/467 |
| 6,583,935 B1 | 6/2003 | Saif et al. | |
| 6,678,865 B1 | 1/2004 | Pratley et al. | |
| 6,816,166 B2 | 11/2004 | Shimizu et al. | |
| 6,833,835 B1 | 12/2004 | Van Vugt | |
| 6,891,540 B2 | 5/2005 | Liao et al. | |
| 6,992,648 B2 * | 1/2006 | Yamada | 345/88 |
| 7,034,819 B2 | 4/2006 | Lee et al. | |
| 7,085,412 B2 * | 8/2006 | Platt et al. | 382/162 |
| 7,133,083 B2 * | 11/2006 | Jaynes et al. | 348/745 |
| 7,152,211 B1 | 12/2006 | Fernandez et al. | |
| 7,191,402 B2 | 3/2007 | Kim et al. | |
| 7,233,370 B2 | 6/2007 | Itaki | |
| 7,489,336 B2 | 2/2009 | Lim | |
| 7,760,231 B2 * | 7/2010 | Sayre | 348/189 |
| 8,023,016 B2 * | 9/2011 | Iijima et al. | 348/265 |
| 8,035,653 B2 * | 10/2011 | Tsai | 345/592 |
| 8,085,303 B2 * | 12/2011 | Sayre | 348/189 |
| 8,334,928 B2 * | 12/2012 | Huang | 348/569 |
| 2002/0136455 A1 | 9/2002 | Lin et al. | |
| 2004/0205477 A1 | 10/2004 | Lin | |
| 2005/0073530 A1 | 4/2005 | Kapur et al. | |
| 2005/0264523 A1 | 12/2005 | Yoshida et al. | |
| 2006/0107223 A1 | 5/2006 | Mirtich et al. | |
| 2006/0203125 A1 | 9/2006 | Sayre | |

OTHER PUBLICATIONS

Hornung, C. P., "Handbook of Designs and Devices", 1836 Basic Designs and Their Variations, copyright 1932, p. 26.

Non-Final Office Action for U.S. Appl. No. 29/238,083, mailed on Apr. 11, 2007, 7 pages.

Notice of Allowance for U.S. Appl. No. 29/238,083, mailed on May 29, 2008, 7 pages.

International Search Report and Written Opinion corresponding to the PCT application No. PCT/US2006/008669, date of mailing Aug. 24, 2007, 9 pages.

Non-Final Office Action for U.S. Appl. No. 11/370,262, mailed on Oct. 15, 2009, 7 pages.

Notice of Allowance for U.S. Appl. No. 11/370,262, mailed on Mar. 10, 2010, 4 pages.

\* cited by examiner

SUPER-BLACK NOT SUPPORTED (INDISTINGUISHABLE PATTERN)

SUPER-BLACK
SUPPORTED
(DISCERNABLE
PATTERN)

ANIMATED DISPLAY CALIBRATION METHOD AND APPARATUS

CROSS-REFERENCE TO RELATED APPLICATION

This application is a continuation of U.S. application Ser. No. 12/837,404, filed Jul. 15, 2010, which is a continuation of U.S. application Ser. No. 11/370,262, filed Mar. 2, 2006, now U.S. Pat. No. 7,760,231, issued Jul. 20, 2010, which application claims the benefit of U.S. Provisional Application No. 60/660,216, filed Mar. 9, 2005, each of which are hereby incorporated by reference for all purposes.

BACKGROUND

The present invention relates to optical display calibration methods and apparatus. More particularly, the present invention relates to novel display calibration test patterns and methods of use. Applications may be applied to displays of any type of media, such as computer animated media.

Throughout the years, movie makers have often tried to tell stories involving make-believe creatures, far away places, and fantastic things. To do so, they have often relied on animation techniques to bring the make-believe to "life." Two of the major paths in animation have traditionally included drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash of the Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into a two dimensional image. Images are then recorded to a media such as film, DVD, or the like, for later viewing.

To display the rendered and recorded images to viewers (e.g., audience, users) in a manner contemplated by the director, display devices need to be properly tuned or calibrated. Some types of calibration include black level adjustment, white level adjustment, gamma correction, contrast adjustment and the like. In the past, methods for optically calibrating displays have typically relied upon static calibration images. Specifically, a calibration image would be displayed on a display device, and based upon how the image appeared on the display device, a user would adjust the brightness, contrast, and the like of the display device. Alternatively, a user would adjust a display driver until the calibration image appeared "correct" to the viewer.

The inventor of the present invention has determined that the ability of users to correctly judge or determine when the calibration image appeared "correct" was often difficult, in part, because of the way humans detect changes in luminance values. More specifically, the inventor realized that with static images, it is difficult for a human to determine whether two similar shades of gray, for example, appear different when displayed.

The inventor also realized that conventional DVD players are unable to reliably display variations in gray scale of less than approximately 3.9%, due to quantization effects of the data coding and data decoding process. Because of these quantization approximations for typical display driving devices, previously one could not readily calibrate displays to a high degree of accuracy.

Additionally, the inventor of the present invention has also determined that although some dedicated display calibration software may have been available, such software was not widely used. One reason was that they were typically stand-alone software packages that a user would have to specifically purchase. Another reason was that they included a number of separate tests for each parameter to be adjusted and requires a user to run a large number of individual tests to calibrate a display. This was also very burdensome, thus consumers were not performing such calibrations. For these reasons, and others, such packages do not appear to be widely used by consumers.

Accordingly, what is desired are improved methods for presenting calibration data to users to facilitate the calibration of display devices.

BRIEF SUMMARY

The present invention relates to optical display calibration methods and apparatus. More particularly, the present invention relates to novel display calibration test patterns and methods of use.

The herein described techniques and display are designed to give users the ability to match settings of the display equipment to settings used during production of a feature/content. This allows users to experience a feature how the director originally intended the content to be seen.

Through the use of various embodiments of the test patterns described herein, a user may adjust the display equipment settings for high fidelity playback. In some cases, these settings enhance details in the shadows, as well as areas with high levels of luminance (i.e., the amount of light in the picture). Additionally, in some embodiments, proper display settings will produce a picture with subtle detail in both dark and light areas. Additionally, in some embodiments, after adjustment, the entire range of the picture, from the darkest to the brightest areas of the image should be observable.

Embodiments of the present invention include novel test patterns that help users modify a display monitor's contrast and brightness settings. The display equipment monitor may include rear-projection, front-projection, DLP, LCD, CRT, plasma, or other type of display.

In specific embodiments, a single set of test patterns allows the user to optimize the black level. As will be illustrated below, a Black Optimize portion of the set of test patterns allows a user to optimize the display of the blacks in the picture, thereby enabling the display of rich shadows, without the loss of detail. The set of test patterns have different gray levels, thereby appearing to blink on and off, making the difference easier for a user to see. In various embodiments, a center bar of the Black Optimize pattern may be the same shade of black as the background of the test pattern. In various configurations, the center bar may be the "darkest" black that the monitor will display.

In various configurations, the four bars on the left portion of the Black Optimize portion of the test pattern, encompass four shades of intensity darker than the "darkest" black. Meanwhile, the four bars on the right portion of the test pattern, encompass four shades lighter than the "darkest" black. Ideally, if a monitor or projector is properly calibrated, the four bars on the left should not be visible while the four bars on the right should be visible as the pattern blinks on and off.

Depending on the capabilities of a DVD player, the monitor or projector, or the like, shades darker than the "darkest" black may not be visible. Some audio/video components cannot play back video levels below the "darkest" black that is found in the background of this test pattern. In various embodiments, shades darker than the "darkest" are sometimes termed "super-black."

In various embodiments, a similar structure may be provided for the white levels. In particular, a number of arrears in the set of test patterns may alternatively blink between the "whitest" white and values less than the "whitest" white, and between the "whitest" white and "super-white." Again, the user may adjust the brightness until "super-white" regions are not perceptible.

In specific embodiments, the single set of test patterns allows the user to optimize the gamma level. As will be illustrated below, the gamma optimization portion of the test patterns includes "ramps" and "blocks." In one embodiment, the ramps are represented by twelve columns that appear from left to right on the screen. Further, in each column, each ramp is made up of alternating horizontal lines of black and a particular shade of gray. In one specific embodiment, in the set of test patterns, one test pattern begins with a black horizontal line, a gray line, a black line, etc; and the next test pattern begins with a gray horizontal line, a black line, a gray line, etc.

In one embodiment, the blocks are represented as squares of uniform gray scale intensity that appear within each Ramp from the top to the bottom on the screen. The shade of gray is the same within each Ramp from top to bottom, but varies in luminance for each Ramp from left to right.

In various embodiments, the shades of gray found in the ramps and blocks help the user determine the ability of the system to display various luminance levels simultaneously. The combination of the ramps and blocks in the set of test patterns can be viewed by the user for adjusting Contrast and/or Gamma (if supported). Additional the ramps and blocks allow a user to set parameters for other possible settings such as "Cinema," "Sport," and other modes.

In some embodiments of the present invention, the ramps and blocks appearing in the set of test patterns may be the same. Accordingly, the user may view the ramps and blocks by squinting, viewing through a pin hole aperture, or the like. By doing so, the user should see the horizontal lines in each Ramp blur together to form a solid gray shade, producing 12 solid vertical bars, each of which has several Blocks within it. The gray Blocks will typically appear to be depressed within the Ramp, raised outwards from the Ramp, or the same shade as the Ramp. The user may then adjust the Contrast and/or Gamma adjustments until the appearance of the blocks and the ramps blur together.

In some embodiments of the present invention, a zone plate is also provided that moves over the set of test patterns. In various embodiments, the zone plates help to illustrate aliasing artifacts and deinterlacing artifacts to users. Additionally, in other embodiments, the quality of appearance of the zone plates depends upon the type of interconnection between the video player device and the display device. For example, the color appearance of the zone plates of a system using S-video or component video connections may be inferior to the appearance of the zone plates of a system using HDMI, DVI, or the like connections, a Faroudja driver, or the like.

Embodiments of the present invention may be applied to virtually any display device, such as DLP displays (DLP projectors and reflective screens or transmissive screens), LCD displays, CRT displays, plasma displays, front or rear projection displays, OLED displays, LCoS displays, computer monitors, or the like. An example of a DLP projector may include a theater DLP projector and a theater screen. Additionally, embodiments may include any number of display driver hardware including DVD players, computer video cards (e.g., GPU), VCR, personal video recorders (PVRs) (e.g., TiVo), or the like.

Various embodiments of the present invention include animated display calibration patterns. More specifically, embodiments are directed to animate picture line-up generator patterns (Pluge patterns), to facilitate the adjustment of black-level and white-level characteristics of a display with an accuracy previously unobtainable. Additional embodiments are directed to animate ramp patterns, to facilitate the adjustment of contrast and/or gamma characteristics of a display. Additional embodiments are directed to a single set of display images that allow a user to adjust brightness, contrast, and/or gamma within a single view.

According to one aspect of the invention, a method for a display is disclosed. One process may include outputting a first display image from the display for at least one display frame time, wherein the first display image comprises a first portion including a first set of intensity values in a first pattern and a second portion including a second set of intensity values in a second pattern. A technique may include outputting a second display image from the display for at least one display frame time, wherein the second display image comprises a first portion including a third set of intensity values in the first pattern and a second portion including the second set of intensity values in the second pattern, wherein the display displays a temporally composite image in response to first display image and in response to the second display image, wherein the composite image includes a first region comprising a combination of the first set of intensity values of the first display image in the first pattern and the third set of intensity values of the second display image in the first pattern, and comprising a second region comprising the second set of intensity values in the second pattern, wherein the temporally composite image is substantially flicker-free. Additionally, a process includes receiving a display control signal for the display from a user in response a visual comparison of intensity values of the first region in the composite image on the display compared to intensity values of the second region in the composite image on the display.

According to another aspect of the invention, a display driving device is disclosed. One apparatus may include a memory configured to store a representation of a first display image and a representation of a second display image. One system may include a processor coupled to the memory, wherein the processor is configured to output the first display image to a display device for a first number of display frames in response to the representation of the first display image, and wherein the processor is configured to output the second display image to the display device for the first number of display frames in response to the representation of the second display image. In various embodiments, the first display image comprises a first portion including a first set of intensity values in a first pattern and a second portion including a second set of intensity values in a second pattern, wherein the second display image comprises a first portion including a third set of intensity values in the first pattern and a second portion including the second set of intensity values in the second pattern, wherein the display device displays a temporally composite image in response to the first display image and in response to the second display image. In various embodiments, the composite image includes a first region comprising a temporal combination of the first set of intensity values of the first display image in the first pattern and the third set of intensity values of the second display image in the first pattern, and comprising a second region comprising the second set of intensity values in the second pattern, wherein the temporally composite image is substantially flicker-free. Additionally, in various embodiments, the visual characteristics of the display device are adjusted by a user in response a visual comparison by the user of intensity values of the first region in the composite image on the display compared to intensity values of the second region in the composite image on the display.

According to another aspect of the invention, a method for adjusting properties of a display is described. One process includes displaying a first image on the display to a user, wherein the display includes a plurality of locations, wherein the first image comprises a first plurality of output values associated with the plurality of locations, and thereafter displaying a second image on the display to the user, wherein the second image comprises a second plurality of output values associated with the plurality of locations, wherein the first plurality of output values are different from the second plurality of output values by approximately 1%, or less. Additional methods may include receiving a display adjustment input from the user, wherein the display adjustment input from the user is in response to the user viewing the first image on the display and in response to the second image on the display.

According to yet another aspect of the invention, an apparatus is described. One system includes a display device configured to display a first image and a second image, wherein the display device is configured to allow a user to adjust display parameters, wherein the display includes a plurality of locations. One apparatus includes a display driving device coupled to the display device, wherein the display driving device is configured to provide the first image to the display device, wherein when the first image is output on the display device, the plurality of locations are associated with a first plurality of display values, wherein the display driving device is also configured to provide the second image to the display device, wherein when the second image is output on the display device, the plurality of locations are associated with a second plurality of display values, and wherein a display value from the first plurality of display values for the first image is different from a display value from the second plurality of display values for the second image by approximately 1%, or less. In various embodiments, the user adjusts the display parameters in response to the first image displayed on the display device and in response to the second image displayed on the display device.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EMBODIMENTS

Figure 1:
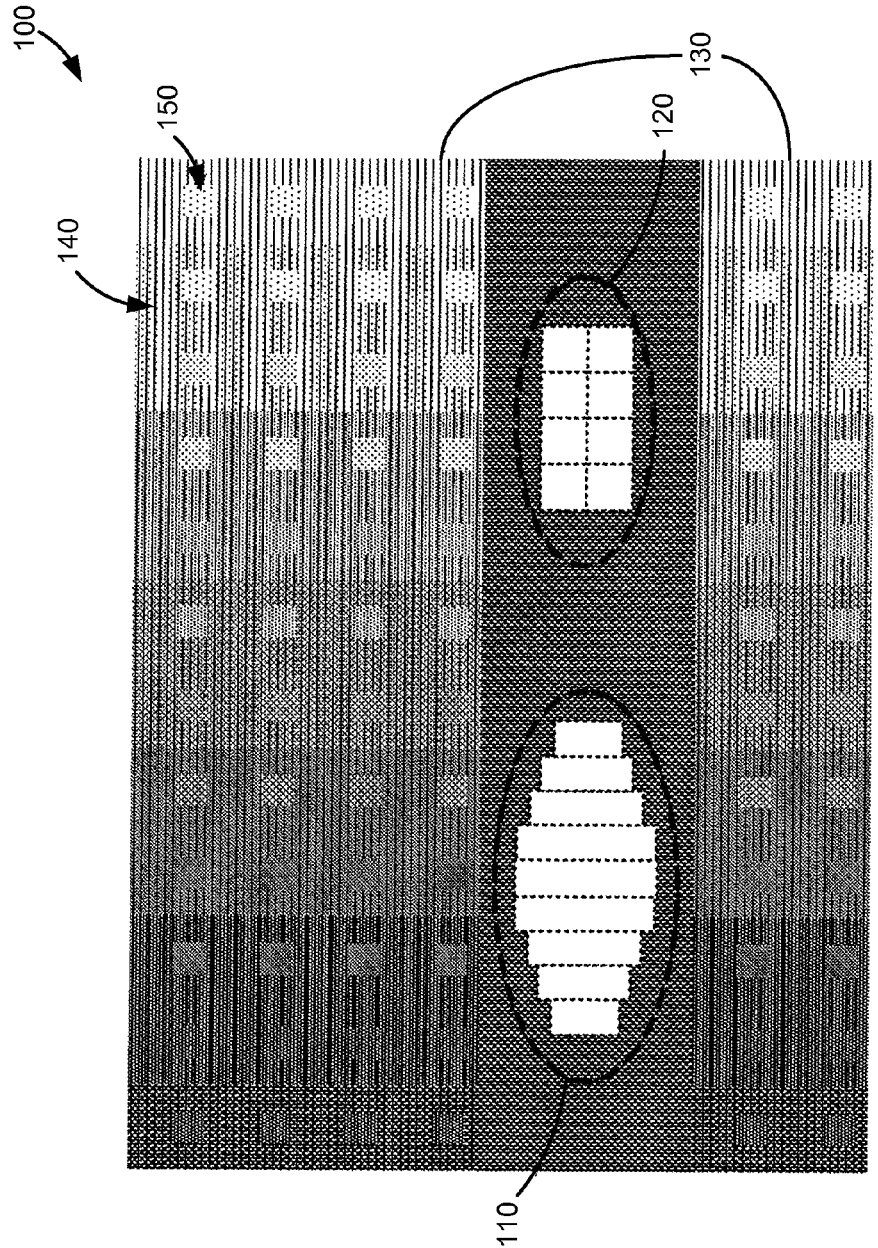
FIG. 1 illustrates a static calibration display indicating a series of test calibration regions.

FIG. 1 illustrates a static calibration display 100 indicating a series of test calibration regions. As annotated in FIG. 1, the regions include a region 110 adapted to be used for calibrating a display black level; a region 120 adapted to be used for calibrating a display white clipping level; and regions 130 including ramps 140 and blocks 150 adapted to be used for calibrating a display gamma value. Static calibration display 100 is not within the prior art, and is referenced for purposes of terminology and understanding.

In the embodiment in FIG. 1, black optimize region 110 includes nine sub-regions (e.g., columns) of interest, however in other embodiments, a greater or lesser number of sub-regions are provided or are of interest. Additionally, in the example in FIG. 1, white check region 120 includes eight sub-regions (e.g., equally sized squares) of interest, however in other embodiments, a greater or fewer number of sub-regions can be used or are of interest. In various embodiments, the shapes of region 110 and region 120 may be changed. For example, the step-type patterns of region 110 may be replaced with a series of adjacent or separated identically-shaped rectangles, squares, circles, or the like. As another example, region 120 may be embodied as a series of eight identically-sized squares, a series of identically-shaped rectangles, may be presented as a series of separated or adjacent shapes such as triangles, ovals, or the like.

Similar to the above, the number and arrangement of ramps 140 and blocks 150 in regions 130 may vary from the embodiment illustrated in FIG. 1. For example, blocks 150 may be other shapes such as rectangles, plus signs, circles, ovals, or the like. Additionally, ramps 140 may have a gray-scale ramp appearance from left-to-right as illustrated, may be ramped top-to-bottom, may include a ramp-up and ramp-down from right-to-left, and/or top-to-bottom, and the like. Ramps 140 may also be shaped as squares, rectangles, triangles, ovals, or other shapes.

Additionally, the arrangement of the regions may be different. For example, region 120 or region 110 may be in the center of display 100, near an edge, or the like. The regions may also be duplicated on a display. For example, more than one black optimize region 110 and/or white check region 120 may be on the display at one time, such as, on opposite diagonal corners, and the like. In still other embodiments, less than all of the regions may be displayed on the display at the same time. As examples: black optimize region 110 and white check region 120 may be on one image; region 130 and region 120 may be on another image; region 110 and region 130 may be on a third image, or the like. Accordingly, in various embodiments, regions 110, 120 and 130 may be presented together within one or more images, and in other embodiments, regions 110 and 120; and 130 may be displayed to the user in separate screens, or may be displayed in various combinations.

In light of the above, one of ordinary skill in the art will recognize the configuration of regions in FIG. 1 is merely one of many possible configurations. Accordingly, the configurations illustrated are not necessarily limiting as to the scope of patent protection.

In various embodiments of the present invention, a scale from 0 to 1 is used to represent intensity values. In other embodiments values from 0 to 255, or others are can also be used. In practice displayable values on a display range from approximately 0.1 to 0.9, with values from approximately 0 to 0.1 (0 to 16/255) termed "super black" values and from approximately 0.9 to 1 (230 to 255/255) termed "super white" values. Typically, super black and super white values should not be discernable on a properly calibrated display.

Figure 2:
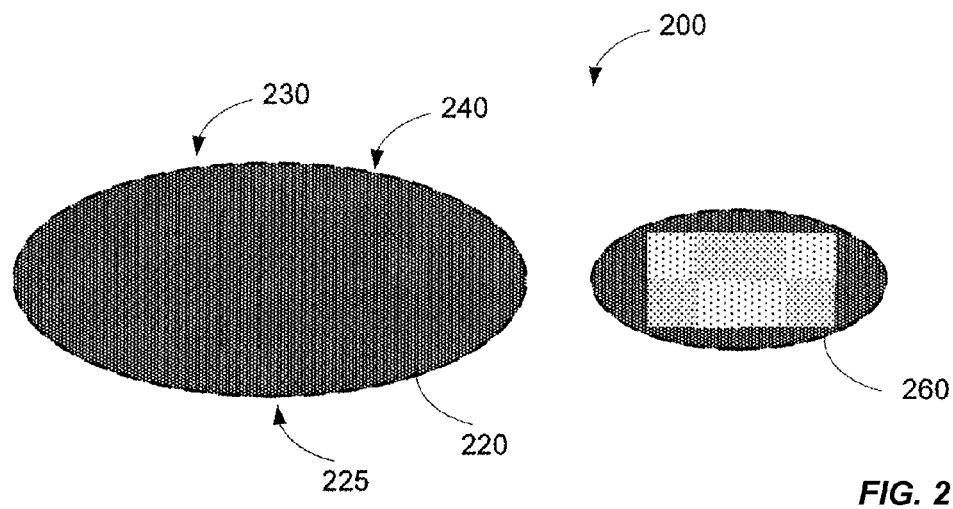
FIGS. 2 and 3 illustrate an embodiment of the present invention.
Figure 3:
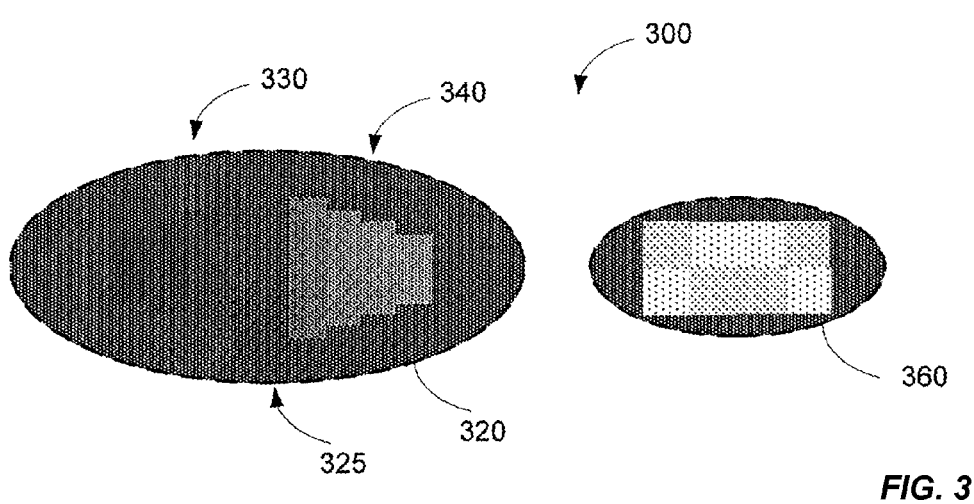

FIGS. 2 and 3 illustrate a set of calibration images used to drive a display. More particularly, FIGS. 2 and 3 illustrate calibration images that are repeatedly displayed to a user on the display device. The example in FIG. 2 illustrates a first state (image) 200 for the calibration regions to be displayed on a display device, and FIG. 3 illustrates a second state (image) 300 for the calibration regions to be displayed on the display device. With such embodiments, as can be seen, the intensity values in first image 200 and second image 300 are different. Accordingly, when successively output to the user, the regions of the respective images that change in intensity appear to a user to be animated (i.e., blink).

FIG. 2 illustrates an example of a first configuration of a black level region 220. In FIG. 2, a middle column 225 is set to represent a black level of 0.1, or the like. Middle column 225 thus represents a region of a display that has the darkest black to be displayed on the display. In the example in FIG. 2, the left four columns 230 and the right four columns 240 may also be set to black level 0.1 in first image 200.

A first configuration of a white level region 260 illustrated in FIG. 2. In this specific example, white check region 260 includes shapes having intensity values that may be less than the maximum value or the whitest white (e.g., 0.9). In the embodiment shown, eight squares are provided in FIG. 2 having different intensity values. For example, the eight squares may have variations from the whitest white such as: −4%, −3%, −2%, −1%, +1%, +2%, +3%, +4%, and the like. As an example, white check region 260 may have values (right to left, top to bottom): 0.9, 0.891, 0.882, 0.9, 0.873, 0.9, 0.9, 0.864.

Figure 4:
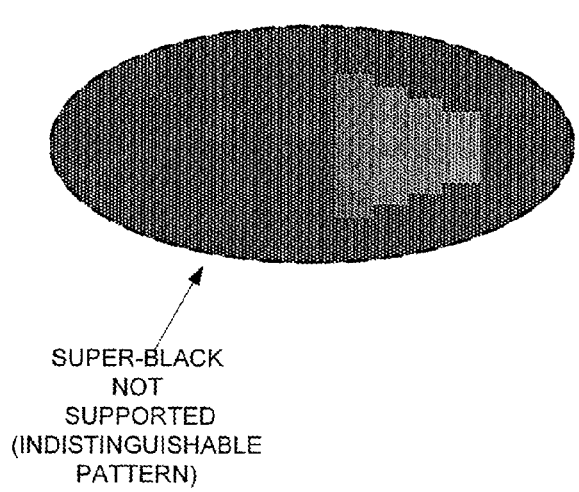
FIG. 4 illustrates an example of a display supporting super-black functionality.
Figure 5:
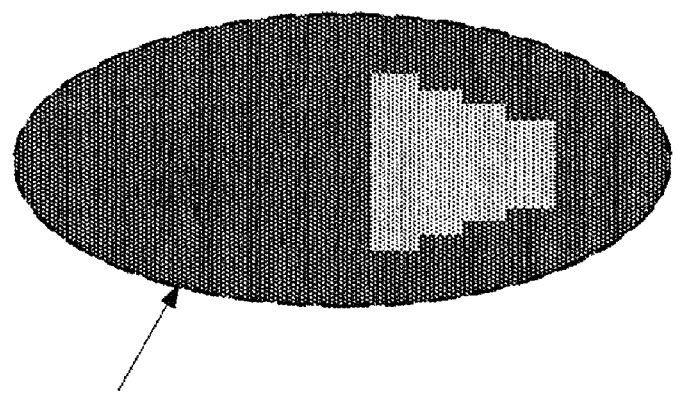
FIG. 5 illustrates another embodiment of the present invention.

FIG. 3 illustrates an example of a second configuration of a black level region 320. In FIG. 3, a middle column 325 may also represent a black level of 0.1, or the like similar to middle column 225. In the example in FIG. 3, the left four columns 330 are set to values less than zero, within the "super-black," if supported by the display driving device. Super-black capability is currently provided by some DVD players, or the like, and supported by some displays (e.g., DLPs). For example, the left four columns may have values such as 0.096, 0.097, 0.098, 0.099 or the like. See FIG. 4 for an embodiment where the display driver does not support super-black. As shown, the left four bars are indistinguishable in intensity from the background black. See FIG. 5 for an embodiment where the display driver supports super-black. As can be seen, the left four bars should be distinguishable in intensity from the background black.

In various embodiments, the right four columns 340 are typically set to black levels greater than zero. For example, the right four columns may have values such as 0.101, 0.102, 0.103, 0.104 or the like.

A second configuration 350 of a white level region 360 illustrated in FIG. 3. In this specific example, white check region 360 includes similar shapes to white check region 260, and has intensity values that may be less than the maximum value or the whitest white. The intensity values for the shapes in white check region 360 should be different from those in white check region 260. As an example, white check region 360 may have values (right to left, top to bottom): 0.891, 0.9, 0.9, 0.882, 0.9, 0.873, 0.864, 0.9.

In operation, Black Optimize regions 220 and 320 provide the user with visual feedback for optimizing the black level appearance on a display device. Proper black level calibration enables the display device to display rich shadows without loss of detail, for example. In the present embodiment, a display device is repeatedly driven with first configuration 220 and second configuration 320. For example, five frames of first configuration 220, five frames of second configuration 320, five frames of first configuration 220; alternatively first configuration 220 is displayed for a certain amount of time, then second configuration 320 is displayed for a certain amount of time; and the like In other examples, additional intensity configurations for the black level regions are contemplated. These additional configurations can also be displayed along with first configuration 220 and second configuration 230, repeatedly.

In various embodiments of the present invention, because the intensity or gray scale values of the black level region change with each different configuration, particular regions within the Black optimize region will typically appear blinking to a viewer of the display. As mentioned above, in this embodiment, middle column 225 and 325 have the same intensity value as the blackest desired black level. Accordingly, the left four columns 330 of middle column 325 appear to successively dip below black (to super black) and then return to black (230). Additionally, the right four columns 340 of middle column 325 appear to successively rise above the black level (325) and then return to black (240). In various embodiments, the apparent "blinking" rate of the left or right four columns may freely set from 1 to 2 a second; from 0.5 to 4 a second, 0.25 to 10 a second, and the like.

If the black level is correctly set, the viewer should not be able to see the blinking of the left four columns (e.g., 330). Conversely, if the user can see blinking of the left four columns (e.g., 330), the user is instructed that the black level of the display device (or display driver) should be decreased. A caveat to the above is that that the black level should be set such the user should still be able to see the blinking of the right four columns (e.g., 340). In various embodiments, when all four bars on the left side of middle column 320 do not visibly blink, and all four bars on the right side of middle column 320 do visibly blink, the black level has been appropriately set. In practical terms, the user cannot see any black values on the screen darker than the desired black level, yet the user can still see black values lighter than the desired black level.

In operation, the White Check regions are used by a user to confirm that the white levels are not being clipped. In the present embodiment, because intensity of gray-scale display driving values for shapes within first configuration 250 and second configuration 260 are different, the White Check region also appears to blink to the user. In various embodiments, White Check allows a user to adjust a display to display the full range of highlight information without artifacts. In one example, if a user can only see, for example, four out of the eight shapes blinking, this may indicate to the viewer that the dynamic range of the display device is too limited, and that the white level must be lowered. In various embodiments, brightness, or contrast of a display may be adjusted by a viewer until all the desired regions within the White Check regions visibly blink. In practical terms, the user can thus visibly distinguish between very light values (e.g., 0.89) and white (e.g., 0.9).

Figure 6:
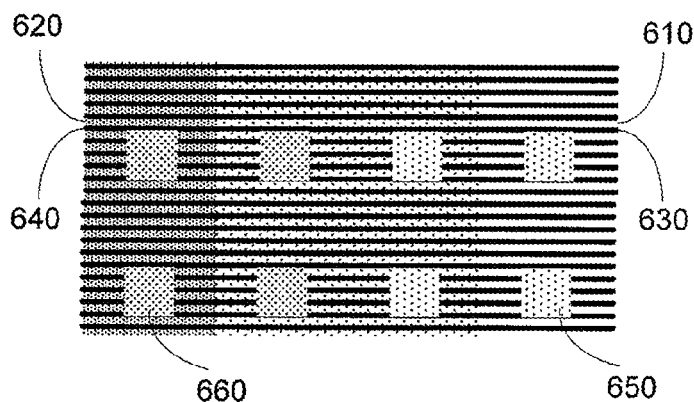
FIGS. 6 and 7 illustrate portions of other embodiments of the present invention.
Figure 7:
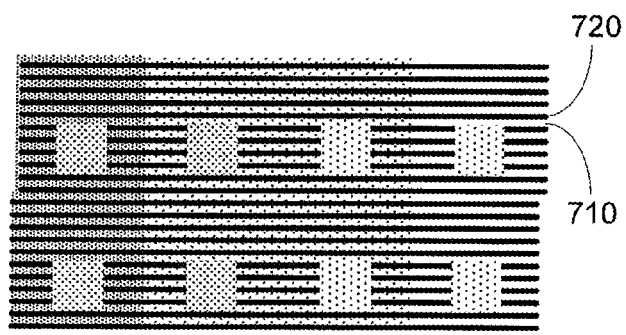

In various embodiments of the present invention, ramps 140 and blocks 150 illustrated in FIG. 1 can be used by a user to properly adjust the gamma of the display device. Although not easily determinable in FIGS. 6 and 7, the orientation of ramps 140 and blocks 150 are different. In FIGS. 6 and 7, ramps 140 may be represented by a series of lines of different intensity, for example the even lines may be lighter in intensity than the odd lines in FIG. 6 and in FIG. 7, the even lines may be reversed, and the odd lines may be lighter in intensity than the even lines. In other embodiments, in a first image the first two lines are light, the next two lines are dark, etc.; and in a second image, the first two lines are dark, the next two lines are light, etc. The values of the dark and light stripes in ramps 140 can be predetermined using conventional gamma control images. As above, these two or more images for ramps 140 may alternatively be displayed on the display to the user. Further, additional configurations may also be used.

In various embodiments, display devices are typically progressive scan devices and may have resolutions such as VGA, SVGA, XGA, WXGA, SXGA, UXGA, 1080p, 720p, 480p or the like. In such embodiments, the refresh rate is often 60 frames per second or greater.

In contrast to the black level and the white level discussions, above, it is desirable that the alternating intensities for ramps 140 to temporally average the different intensity values as viewed by a viewer. Merely as an example, a line on the display device may have an intensity of 0.8 (line 610) for a first 0.25 seconds, an intensity of 0.1 (line 720) for the next 0.25 seconds, an intensity of 0.8 for the next 0.25 seconds, and the like. In such an example, the line appears to have an average intensity of approximately 0.45. The temporal averaging may be a feature of the display device or physiology of the eye.

In various embodiments, the value of blocks 150 are predetermined to be the average of the high and low values of the ramps surrounding the respective blocks. For example, as illustrated in FIG. 6, line 610 has a value of 0.8, line 620 has a value of 0.5, line 630 has a value of 0.1, and line 640 has a value of 0.1. Additionally, block 650 has a constant value (between the configurations) of approximately 0.45, and block 660 has a constant value (between the configurations) of approximately 0.3.

In some embodiments, the user attempts to adjust the gamma values of ramps 140 that drive the display (or the display driver) until ramps 140 and blocks 150 blend together and have the same apparent luminance for a given "mode" setting, such as "Cinema," "Sport," "Game," and the like.

FIGS. 6 and 7 illustrate a more detailed portion of a set of calibration images. In this example, in FIG. 6, ramps 140 are represented as alternating lines, as shown, and blocks 150 are represented by solid square patches. In FIG. 6, a ramp pattern is represented by two lines of a first intensity, two lines of a second intensity, two lines of a first intensity, etc. As can be seen lines 630 are immediately above a block, and are dark in intensity. Above that are lines 610 that are lighter in intensity. In FIG. 7, the ramp pattern is also represented by two lines of a first intensity, two lines of a second intensity, two lines of a first intensity, etc. However, as can be seen lines 710 immediate above a block are light in intensity. This contrasts to 630, above.

As discussed above, the calibration images in FIGS. 6 and 7 are repeatedly output to drive the display. The images are then alternatively displayed to the user (e.g., FIG. 6, FIG. 7, FIG. 6, FIG. 7, etc.). To the viewer, the lines above the block are dark 630 for the next frame, are light 710 for one frame, are dark 630 for one frame, etc. As a result, the values for each line are respective temporal integrations of the values on that line from the different calibration images. In various embodiments of the present invention, when the gamma has been appropriately been adjusted for the display device, the values of the blocks and surrounding ramps should not be distinguishable for all blocks. Further, if certain blocks are distinguishable from the respective ramps, the gamma requires further adjustment.

In other embodiments of the present invention, the ramps or blocks may appear in other geometric configurations such as stripes in a vertical direction, such as checkerboard patterns, triangular patterns, or the like. For example, in a checkerboard pattern, for a first calibration image, the right topmost square may be light, and for the second calibration image, the right top-most square may be dark, etc. In light of the present disclosure, the inventor believes that many possible designs and arrangements of patterns for the ramps or blocks can be envisioned to one of ordinary skill in the art.

Exemplary techniques for display calibration include:

I) Starting with "Black Optimize." Turn the "Brightness" (or black level) control up until all nine bars are visible in the Black Optimize region. The black level and white level regions may look similar to FIG. 4 or 5.

a) If the bars on the left are visible, the display and display driver both support "super-black" (e.g., FIG. 5), turn-down the Brightness, until the left four bars do not visibly blink. In other words, the four bars should appear as black as the black background. Ideally, the four bars on the right of the Black Optimize pattern should remain visibly blinking.

b) If bars on the left do not visibly blink, despite the increased brightness, the display driver does not support super-black and brightness adjustments may not be made as accurately. (e.g., in FIG. 4). The brightness should then be turned down, such that the four blocks on the left remain just visibly blinking.

In either case a) or b), the Brightness should be then be set correctly, given the setting of all other controls.

Note, after making subsequent adjustments to the display, such as Gamma adjustment (described below), Picture adjustment or specialized "Cinema" controls, the Black Optimize should typically be checked and or repeated, as necessary.

II) Gamma correction is performed. In this embodiment, looking at the Ramps and blocks on the display, a user may use a "Gamma" or "Gamma Trim" control in preference to the Contrast control. In various embodiments, the Contrast (or gamma controls) are adjusted such that the Blocks neither visually "protrude" from nor "recede into" the ramp bars. In other words, the Blocks and the Ramps should have matched intensity for all ramp/block sets.

III) Check the "White Check" pattern. The viewer then visually checks the White Check pattern to make sure the blocks are still visibly blinking. If they have become washed-out and no longer distinguishable, the Contrast or Brightness need to be lowered, and other adjustments such as Picture, Gamma and possibly custom "Cinema/Sport" settings may be used to compensate for the decrease.

IV) In some embodiments of the present invention, the above steps are repeated until all three conditions are satisfied.

Specific novel features of embodiments of the present invention are believed to include combinations of animated calibration displays and/or increased output level accuracy.

Figure 8:
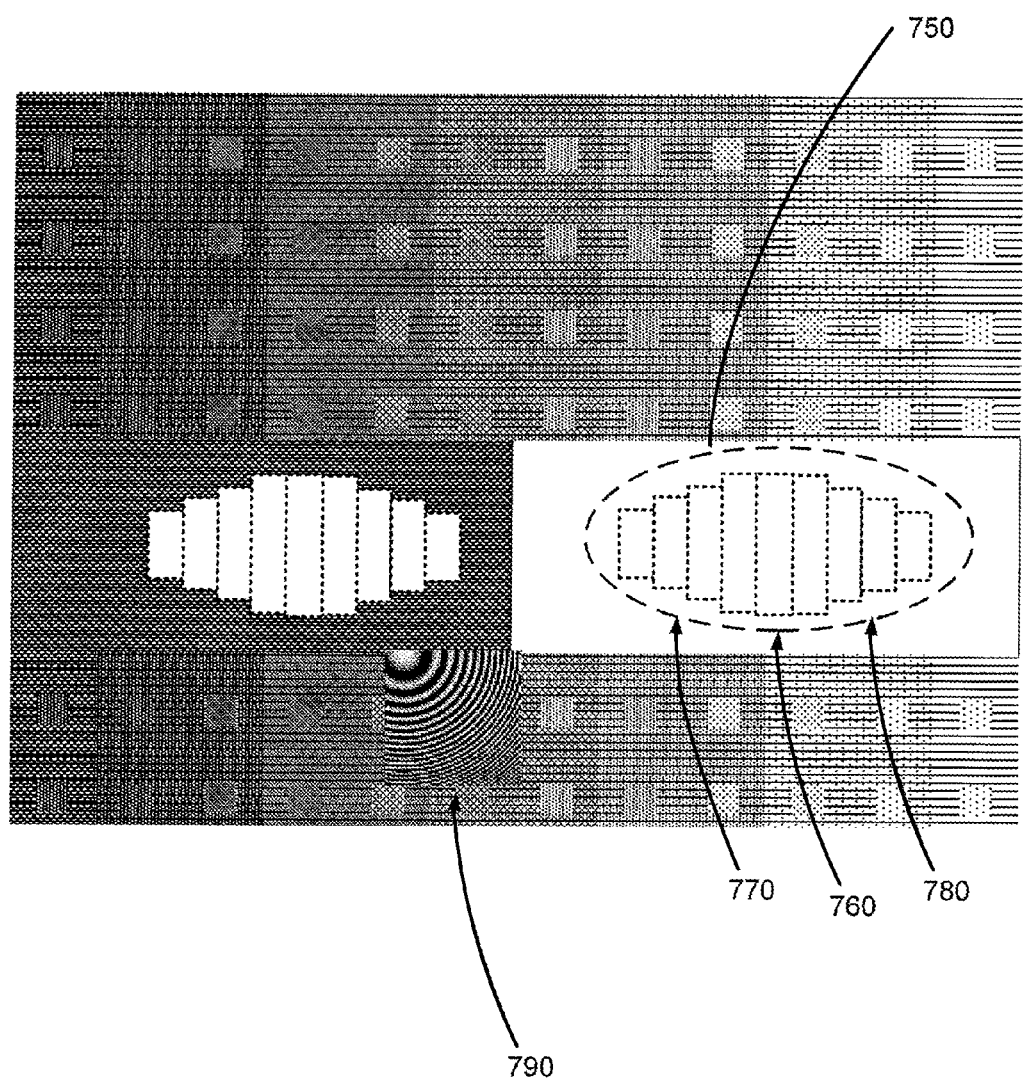
FIG. 8 illustrates another embodiment of the present invention.

FIG. 8 illustrates another embodiment of the present invention. In this embodiment a region 750 (a "White Optimize region") is adapted to be used for calibrating the display white level. The operation of region 750 is similar to the display black level region 110, in FIG. 1. In this embodiment, center bar 760 may be held at the super white value (e.g., 0.9), and the bars 770 to the left of center bar 760 may also be at super white (e.g., 0.9) in a first calibration image, and may be at varying levels in a second calibration image (e.g., −4%, −3%, −2%, −1% from 0.9). Additionally, the bars 780 to the right of center bar 760 may also be at super white (e.g., 0.9) in a first calibration image, and may be at varying levels in a second calibration image (e.g., +1%, +2%, +3%, +4% from 0.9). Similar to black check region 110, blinking of values less than super white should be discernable by a user on the display, whereas super white blinking should not be discernable by a user on a properly calibrated display.

FIG. 8 also illustrates a zone plate 790. In various embodiments of the present invention, zone plate 790 may move about an image and serve as a "magnifying" glass to give a close-up view of portions of the calibration images. In various embodiments, the set of calibration images include calibration images where zone plate 790 moves over different portions of the image. In various embodiments, zone plate 790 should be a smoothly moving zone plate pattern. There is not typically a "right answer", but rather a pattern to assist the user in assessing relative image and motion quality. With multiple resolutions, deinterlacing or output interfaces for a display and a display driver, the user may compare results while watching tracking this pattern. In various embodiments, the motion of the pattern should be smooth, with little hitching or stuttering. Additionally, there should be little visible horizontal or vertical structure, little color interference, only black and white. In various embodiments, the zone plate allows the user to see detail across the entire pattern. Typically, it is envisioned that users will compare the various output and input modes of a display driver player and monitor or projector, to find a pleasing combination.

It is typically very difficult to see subtle luminance transitions in a static image. In traditional "Pluge" (Picture Line-Up Generator) patterns, three bars are output, each of which are approximately 4% different from each other in luminance. Specifically, using 8-bit data quantization tables, the three bars are typically 1 bit different in intensity (1/256=3.9%). In light of this, typical conventional DVD players cannot reliably display gray scale intensity values that are less than approximately 4% apart, such as 3%, 2%, 1%, or the like.

In contrast, in various embodiments of the present invention, the "Black Optimize" and "White Optimize" patterns drives the display with intensity values that are approximately 0.9% different in luminance from each other. Specifically, MPEG/DVD standards specify 10-bit values are mapped to 8 bits values in a process termed quantization. In other embodiments, the difference in luminance may be varied from about 0.5% to almost 4%. These differences in luminance are very difficult to perceive statically as the user adjusts black (or white), causing the percentage difference to become extremely small on the left-side of the pattern, as the bars begin to fall below black. Using embodiments of the present invention, the differences are astonishingly easy to see with animation. This is believed so because while the human eye can see absolute luminance levels in the true state of scotopic vision (below approximately 0.034 cd/m^2), this condition is essentially never met in video or film reproduction. However, the human eye can perceive luminance changes in time (i.e., motion) easily, in all lighting conditions, and at both the dark and bright ranges of luminance levels.

The small differences (e.g. 0.9%) in luminance values can also be used in the White Contrast pattern. Additionally, differences in luminance may range from approximately 0.5% to almost 4%. As illustrated, the differences in luminance alternates (dark→bright switches to bright→dark), and in some embodiments, alternates are presented (flopped) next to each other to maximize simultaneous contrast.

In various embodiments the animation rate for the "black optimize" pattern and the "white optimize" pattern must be carefully chosen to fall well outside the flicker-fusion range, yet still be fast enough to stimulate the change-sensation in the eye. In one embodiment of the present invention, the patterns switch at a rate of about 4 Hz, but may be different in other embodiments, such as 1 Hz, 0.5 Hz, or the like. In contrast, for the "gamma" pattern, fusion of the two or more configurations is desired, accordingly, these patterns may switch at the rate of less than 4 Hz, 30 Hz, 60 Hz, or as desired.

In various embodiments, the use of intensity values that are aligned with DCT blocks and 10-bit DC coefficients improve the luminance accuracy. In some embodiments, because the 0.9% luminance encode (e.g., 1, 3, 5 etc.) translates to exactly two bits in the final output, high accuracy luminance output is desired. In other portions of the calibration images, specifically the Transfer Optimize Blocks, full-scale 1-bit accuracy is required. The industry currently believes that 4-bit accuracy is unachievable with inexpensive consumer display driving devices (e.g., DVD players). Accordingly, to avoid potential problems with round-off, sloppy math calculations, and "chroma bugs" seen in some chipsets, the following process was used to achieve high accuracy:

a) The calibration patterns that have high accuracy are formed out of 8×8 pixel blocks arrayed on an 8×8 grid. In various embodiments, the grid is defined inside the 720×480 container (720×576 for PAL) with which MPEG encoding is done. 720×480 or 720×576 represents current DVD resolution. In other embodiments, higher resolution, such as 1080p resolution may also be used. The values of the pixels in each 8×8 pixel block are set constant. Accordingly, each of these 8×8 pixel blocks corresponds to a single DCT transform coding instance, and thus each of these blocks will ideally have zero coefficients for everything except for the DC coefficient (i.e., AC coefficients of "0"). For example, the coefficients for the 8×8 block is the DC bias, the coefficients for four 4×4 sub-blocks are 0; the coefficients for 16 2×2 sub-blocks are 0; the coefficients for 64 1×1 sub-blocks are also 0. In other words, each 8×8 block represents data having a "flat field."

b) It is possible inside the MPEG-2 encoding method used for DVDs to specify 10-bits to be used for DC coefficient precision. Accordingly, quantization tables of DVD players, or the like and the variations is outputs provided by different DVD players are bypassed for DC coefficients, in various embodiments. Thus, essentially 10-bit accuracy is possible for luminance [Y] encoding, thus enabling full and accurate 8-bit luminance values to be output to the DACs of the display driver. Accordingly, in various embodiments described above, a 0.9% (1/1024~=0.1%) difference in luminance values can be achieved for the calibration patterns illustrated above.

In light of the above, extremely high accuracy test patterns are possible with modest bit streams.

As discussed above, for gamma calibration, a temporal integration between two or more configuration images can be relied upon. These embodiments are implementable on progressive scan displays and players without excessive flickering. In such embodiments, a 60 Hz pattern can be used, and true temporal fusion may appear to the user. Accordingly, the viewer can more easily make adjustment to the monitor. In practice, these embodiments are quite effective.

In some embodiments, patterns are constructed such that the de-fielding algorithms of the DVD player or display essentially pull the fields apart into different images. Typically moving horizontal lines is discouraged, as most deinterlaces view that as aliasing. Accordingly, the ramp lines are at least two display lines wide. In other embodiments, alternating vertical stripes of black and the selected intensity (rather than alternating horizontal lines) can be used that swap back and forth every 60 Hz. The result is a solid band of true half-intensity (in the photon sense) illumination. Depending on the deinterlacer algorithm, an alternate embodiment creates a checkerboard where the gray and black squares trade places every 60th of a second.

Figure 9:
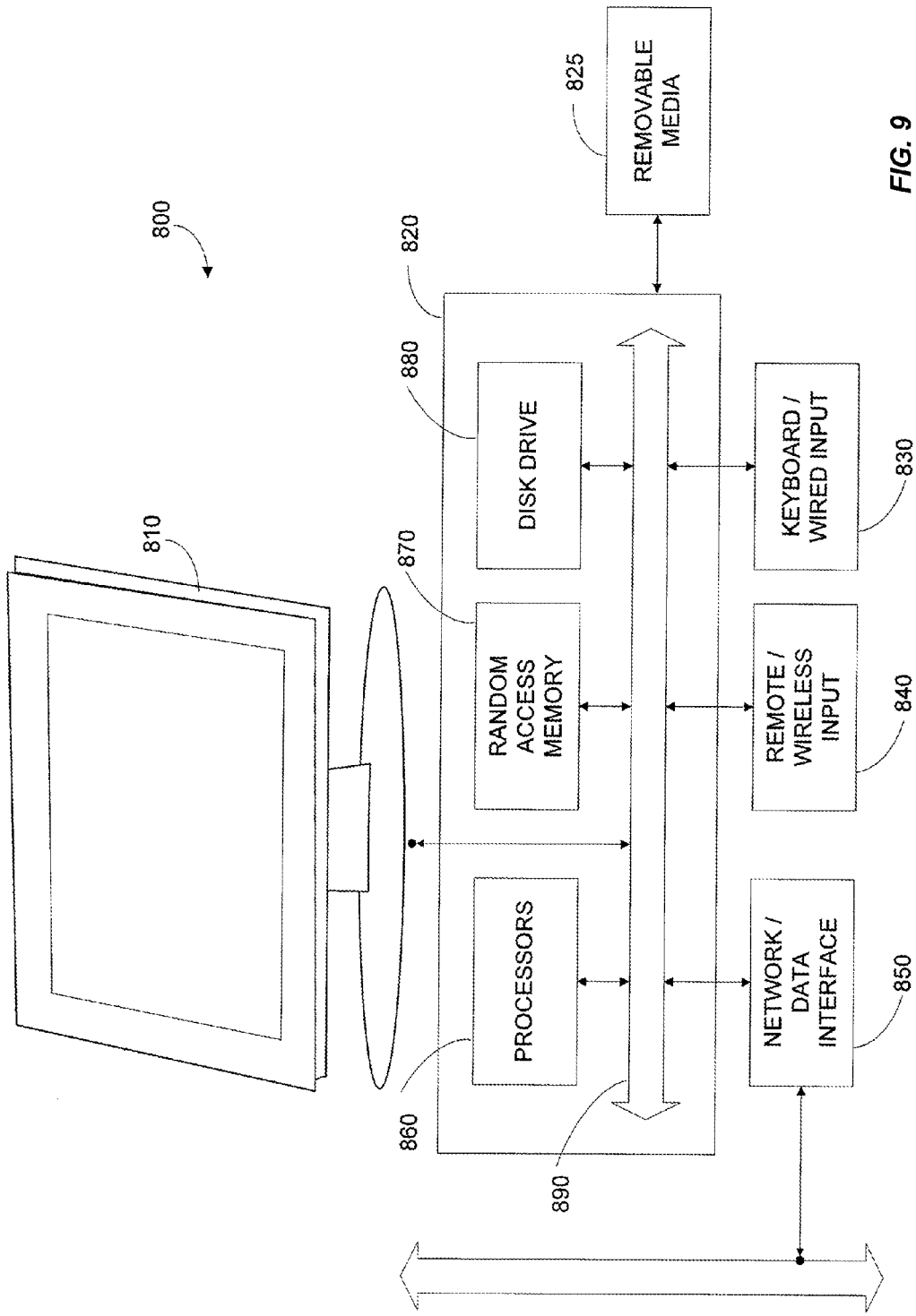
FIG. 9 illustrates an embodiment of the present invention.

FIG. 9 is a block diagram of an embodiment of the present invention. Specifically, a display system 800 is illustrated including a display driver 820 coupled to one or more display devices 810. A variety of user input devices, 830 and 840 may be provided as inputs to display driver 820. In one embodiment, a data interface 850 may also be provided.

In various embodiments, display device 810 may be a television or monitor display such as a CRT display, plasma display, LCD display, OLED display, or the like. Some common embodiments include home-theater displays, computer displays, and the like. Such displays are sometimes termed user direct-view displays. In various embodiments, display device 810 may include a DLP projector, LCD projector, CRT projector, or the like. Such displays also typically include reflective-type screens which reflect-back light to a viewer. Some common embodiments may include a home-theater or a commercial big-screen theater, or the like. Additionally, in various embodiments, display device 810 may be a DLP rear-projection display, an LCoS rear-projection display, a CRT rear-projection display, or other rear-projection display. In such embodiments, an image is projected onto a back-side of a translucent media which is then viewed by a viewer. In some embodiments of the present invention, display devices 810 may be non-interlaced, progressive-scan monitors.

In various embodiments, user input device 830 includes wired-connections such as a computer-type keyboard, a computer mouse, a trackball, a track pad, a joystick, drawing tablet, microphone, and the like; and user input device 840 includes wireless connections such as wireless remote controls (e.g. infrared remote, radio frequency remote), wireless keyboards, wireless mice, and the like. In the various embodiments, user input devices 830-840 typically allow a user to select objects, icons, text and the like that graphically appear on a display device (e.g. 810) via a command such as a click of a button or the like. Other embodiments of user input devices include front-panel buttons on display driver 820.

Embodiments of data interfaces 850 typically include an Ethernet card, a modem (telephone, satellite, cable, ISDN), (asynchronous) digital subscriber line (DSL) unit, FireWire interface, USB interface, and the like. In various embodiments, data interfaces 850 may be coupled to a computer network, to a FireWire bus, a Satellite cable connection, an optical cable, a wired-cable connection, or the like. In various embodiments of the present invention, data interfaces 850 may include analog or digital image data to be decoded and output to users via display devices 810. In other embodiments, computer interfaces 850 may be physically integrated on the motherboard of display driver 820, may be a software program, such as soft DSL, or the like.

In various embodiments, display driver 820 may include familiar computer-type components such as a processor 860, and memory storage devices, such as a random access memory (RAM) 870, disk drives 880, and system bus 890 interconnecting the above components.

In various embodiments, display driver 820 includes a microprocessors or microcontroller. Further, in various embodiments, display driver 820 typically includes an operating system.

RAM 870 and hard-disk drive 880 are examples of tangible media configured to store data such as encoded and decoded audio and video data, or the like. Other types of tangible media includes removable hard disks, optical storage media such as CD-ROMS, DVD-ROMS, and bar codes, semiconductor memories such as flash memories, read-only-memories (ROMS), battery-backed volatile memories, networked storage devices, and the like (825).

In the present embodiment, display driver 820 may also include software that enables communications over a network such as the HTTP, TCP/IP, RTP/RTSP, and other encrypted and/or proprietary protocols, and the like. In alternative embodiments of the present invention, other communications software and transfer protocols may also be used, for example IPX, UDP or the like.

FIG. 9 is representative of a display driver 820 capable of outputting images for display devices 810. It will be readily apparent to one of ordinary skill in the art that many other hardware and software configurations are suitable for use with the present invention. For example, display driver 820 may be a personal video recorder (PVR) such as TiVo, a cable-decoder box, a DVD player, a Blu-ray DVD player, a HD DVD player, a notebook computer, a desktop computer, a media center computer, a handheld device (e.g., PIM, iPod, PSP), a video-tape player, or the like. In still other embodiments, the techniques described below may be implemented upon a chip or an auxiliary processing board (e.g., graphics processor unit).

In one embodiment of the present invention, display driver 820 is a DVD-player, and the calibration images illustrated above are stored in an encoded form into a DVD disk. The user then navigates one or more menus of the DVD disk to have display driver 820 display calibration images. In this embodiment, two alternating calibration images are then decoded from data stored on the DVD disk and then output to a display device (e.g., display device 805) for the user to view. As discussed above, certain parameters of the display device are then adjusted by the user, based-upon viewing the two alternating calibration images, until the user is satisfied with the calibration of the display device. The display device is then calibrated for play-back of additional data from the DVD disk or other source. As detailed above, the calibration may be independently set for the black and white levels from the gamma levels. In other embodiments, a display driver may internally store calibration images, as described above. These images are then retrieved and used for calibration, independent of the DVD disk or other media.

Further embodiments can be envisioned to one of ordinary skill in the art after reading the attached documents. For example, more than two calibration images may be displayed, increasing the amount of "animation" apparent to a viewer of the display. In other embodiments, the different calibration images may have obvious differences, such as colored dots (e.g., black dots, white dots) at different locations (e.g., corners) on each calibration image so that the user is made aware when to look for differences in the black optimize regions and white check regions. In still other embodiments, the two or more calibration images are converted into a stream of images on the display at least 30 frames a second, e.g., frozen on the screen. Because the stream of images includes duplicate repeating images, the bit stream requirement of such embodiments is very small.

In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for calibrating display device, the display device being capable of presenting viewable images on a display area, the method comprising:
    a) determining a plurality of display portions of the display area, including at least a first display portion and a second display portion, wherein the plurality of display portions collectively define a display image;
    b) determining at least a first pattern for the first display portion and a second pattern for the second display portion;
    c) outputting a first display image using the display device, for at least a first display period, the first display image comprising a first set of intensity values mapped to the first pattern and a second set of intensity values mapped to the second pattern;
    d) outputting a second display image using the display device, for at least a second display period, the second display image comprising a third set of intensity values mapped to the first pattern and a fourth set of intensity values mapped to the second pattern, wherein the third set of intensity values is different from the first set of intensity values;
    e) repeating steps c) and d) for a time sufficient for a changing display to be observed by a user for calibration purposes; and
    f) accepting user input reflecting user observation of the changing display.

2. The method of claim 1, wherein the first and second display images are stored on a disk and output in response to disk player menu selections.

3. The method of claim 2, wherein the disk is a disk encoded with data using one or more of a DVD format, a Blu-ray format, and/or a HD format.

4. The method of claim 1, wherein the user input is in the form of remote control commands for a remote control of the display device.

5. The method of claim 4, wherein the remote control is a remote control for one or more of a personal video recorder, a cable-decoder box, a DVD player, a Blu-ray DVD player, an HD DVD player, a notebook computer, a desktop computer, a media center computer, a handheld device, and/or a videotape player.

6. The method of claim 1, wherein the user input represents a request for altering at least one display parameter that is a black-level setting, a white-level setting, a contrast setting, a brightness setting and/or a gamma setting.

7. The method of claim 1, further comprising additional display images beyond two display images, wherein the additional display images are displayed for additional display periods.

8. The method of claim 1, wherein the fourth set of intensity values is equal to the second set of intensity values and wherein the first display period is equal to the second display period and both are equal to at least one display frame time.

9. The method of claim 1, further comprising receiving a display control signal indicative of a user response to a visual comparison of intensity values of the first region compared to intensity values of the second region as the display alternates among at least the first and second display images.

10. The method of claim 1, further comprising repeating steps a)-f) until an indication is received that the intensities of pixels in the first pattern substantially visually match the intensities of pixels in the second pattern.

11. The method of claim 1, wherein outputting the display image using the display device comprises providing an output signal to at least one of a progressive-scan CRT display, a progressive-scan plasma display, a progressive-scan LCD display, a progressive-scan DLP display, a projector, a reflective screen, and/or a transmissive screen.

12. A computer program product that comprises a non-transitory tangible media storing computer-executable code for execution upon a computer system including a processor, the computer program product comprising:
    code that directs the processor to determine a plurality of display portions of the display area, including at least a first display portion and a second display portion, wherein the plurality of display portions collectively define a display image;
    code that directs the processor to determine at least a first pattern for the first display portion and a second pattern for the second display portion;
    code that directs the processor to output a first display image using the display device, for at least a first display period, the first display image comprising a first set of intensity values mapped to the first pattern and a second set of intensity values mapped to the second pattern;
    code that directs the processor to output a second display image using the display device, for at least a second display period, the second display image comprising a third set of intensity values mapped to the first pattern and a fourth set of intensity values mapped to the second pattern, wherein the third set of intensity values is different from the first set of intensity values;

code that directs the processor to repeat a varying display of at least the first display image and the second display image for a time sufficient for a changing display to be observed by a user for calibration purposes; and code that directs the processor to respond to user input reflecting user observation of the varying display.

13. The computer program product of claim 12, wherein the user input represents a request for altering at least one display parameter that is a black-level setting, a white-level setting, a contrast setting, a brightness setting and/or a gamma setting.

14. The computer program product of claim 12, further comprising:

code that directs the processor to output additional display images beyond two display images, wherein the additional display images are displayed for additional display periods.

15. The computer program product of claim 12, wherein the fourth set of intensity values is equal to the second set of intensity values and wherein the first display period is equal to the second display period and both are equal to at least one display frame time.

16. A display driving device comprising:
one or more processors configured to:
a) determine a plurality of display portions of the display area, including at least a first display portion and a second display portion, wherein the plurality of display portions collectively define a display image;
b) determine at least a first pattern for the first display portion and a second pattern for the second display portion;
c) output a first display image using the display device, for at least a first display period, the first display image comprising a first set of intensity values mapped to the first pattern and a second set of intensity values mapped to the second pattern;
d) output a second display image using the display device, for at least a second display period, the second display image comprising a third set of intensity values mapped to the first pattern and a fourth set of intensity values mapped to the second pattern, wherein the third set of intensity values is different from the first set of intensity values;
e) repeat steps c) and d) for a time sufficient for a changing display to be observed by a user for calibration purposes; and
f) accept user input reflecting user observation of the changing display.

17. The display driving device of claim 16, wherein the first and second display images are stored on a disk and output in response to disk player menu selections.

18. The display driving device of claim 16, wherein the user input represents a request for altering at least one display parameter that is a black-level setting, a white-level setting, a contrast setting, a brightness setting and/or a gamma setting.

19. The display driving device of claim 16, wherein the one or more processors are further configured to:
output additional display images beyond two display images, wherein the additional display images are displayed for additional display periods.

20. The display driving device of claim 16, wherein the fourth set of intensity values is equal to the second set of intensity values and wherein the first display period is equal to the second display period and both are equal to at least one display frame time.

* * * * *